2,874,082

COMPOSITE ASSEMBLY OF DIE STEEL CORE AND STAINLESS STEEL COATING

Adolph J. Lena, Sarver, and Glenn W. Bush, State College, Pa., assignors to Allegheny Ludlum Steel Corporation, Brackenridge, Pa., a corporation of Pennsylvania No Drawing. Application April 18, 1957
Serial No. 653,539

5 Claims. (Cl. 148—31.5)

This invention relates to a composite assembly having a core of an air hardening hot work die steel and surfaces of austenitic stainless steel and the heat treatment therefor.

In structural applications it is desirable to use a high strength material in order to minimize the total weight of the structure. This is especially true in aircraft applications where the weight of the aircraft is extremely important in determining its performance. It is for this reason that most conventional aircraft operating at subsonic speeds have their structural members as well as the skin covering made from a light weight non-ferrous alloy, usually aluminum, which alloy has a particularly attractive strength to weight ratio. These alloys, however, suffer a severe loss in strength when heated to temperatures in excess of about 300° F. and are particularly unsuited for use as structural components which may be subjected to such temperatures. Modern trends indicate that most competitive aircraft must be designed for flight at supersonic speeds. This is particularly true with military aircraft, guided missiles and rockets which during flight at supersonic speeds encounter surface heating conditions due to air friction with the result that temperatures in excess of 300° F. are often produced. This has necessitated the use of the more expensive titanium base alloys instead of aluminum base alloys for both the structural components and the skin covering in many aircraft and missile applications.

The most readily available material for such application from the standpoint of strength and cost is steel. However, steel has a lower strength to weight ratio than titanium alloys. In the past, some ferrous base alloy steels have been employed in aircraft structural applications. These steels were usually of the precipitation hardening stainless steel group, which while capable of being heat treated to tensile strengths of about 200,000 p. s. i. have insufficient strength for many applications. Hence there is an apparent need for low cost steels having tensile strengths of more than 240,000 p. s. i. Some steels presently known today while capable of obtaining strengths in excess of 240,000 p. s. i. have properties which make them unsuitable for such aircraft application. For example, a low alloy steel, such as AISI Type 4340, can be heat treated to obtain a tensile strength of 280,000 p. s. i. However, in order to develop such strength the steel must be oil or water quenched from a high temperature and the distortion which occurs during this operation prevents the use of such steels as structural and skin coverings of aircraft. Higher alloy steels such as certain grades of tool steels are capable of air hardening thus minimizing the distortion problem. However, these steels as well as the low alloy steels do not have sufficient oxidation or corrosion resistance to prevent rusting and scaling during service and, in addition, are subject to a high degree of decarburization during heat treatment thus necessitating special heat treatment procedures. Certain grades of hardenable stainless steels such as AISI Type 420 have high strength. However, this particular grade of steel which contains only 12% chromium is subject to rusting during service and, in addition, such steels are highly susceptible to stress corrosion cracking during service or during cleaning operations such as pickling after the hardening heat treatment. None of the foregoing steels possess sufficient corrosion resistance for applications where chemical attack is concerned.

An object of this invention is to provide a composite assembly having a core of an air hardening hot work die steel and surface layers of an austenitic stainless steel.

Another object of this invention is to provide a composite assembly having a core of an air hardening hot work die steel and surfaces of an austenitic stainless steel, said composite assembly being heat treatable to tensile strengths in excess of 240,000 p. s. i.

A more particular object of this invention is to provide a composite assembly having an air hardening hot work die steel core and austenitic stainless steel surfaces which can be heat treated to provide tensile strengths in excess of 240,000 p. s. i., the composite assembly being characterized by having good general corrosion and oxidation resistance and by having a minimum amount of distortion upon heat treatment.

Other objects of this invention will become apparent when read in conjunction with the following description.

In its broader aspects this invention contemplates a heat treatable composite assembly having an air hardening hot work die steel core and austenitic stainless steel surfaces, said surfaces comprising between 8% to 20% by weight of the composite assembly. The core material may be made of any air hardening hot work die steel and in particular it has been found that an air hardening hot work die steel comprising from about 0.25% to about 0.45% carbon, from about 0.15% to about 0.60% manganese, from about 0.70% to about 1.2% silicon, from about 4.5% to about 6.0% chromium, from about 0.1% to about 1.2% vanadium, from about 0.9% to about 1.75% molybdenum, up to 1.5% tungsten, up to 2% nickel and the balance iron with incidental impurities has been particularly suited for the core material in the composite assembly. The surface layers of austenitic stainless steel which are particularly suitable for this application have a composition comprising up to 0.25% carbon, up to 15.0% manganese, up to 1.5% silicon, from about 12% to about 20% chromium, from about 3.5% to about 10% nickel, up to 3.5% molybdenum, up to 0.15% nitrogen and the balance iron with incidental impurities. It is desirable to maintain the surface layers of austenitic stainless steel within the range between about 8% and about 20% by weight of the composite assembly. It has been found that when the surface layers are maintained within this range, sufficient corrosion resistance is imparted to the article formed from the composite assembly, yet the overall strength is not sufficiently adversely affected to reduce the tensile strength of the composite assembly to below 240,000 p. s. i.

The composite assembly may be formed in any of the well-known manners for producing clad metal. We have found that the process described in Patent Nos. 2,718,690 and 2,758,368 issued in the name of John B. Ulam has been most successful in producing the composite assembly described herein having integrally bonded adjacent contacting surfaces. When produced in accordance with the process described in the Ulam patents the composite assembly may be hot worked to the form of the desired semi-finished mill product. This material can then be further processed either by hot rolling, cold rolling or fabricating into the desired shape of the finished product prior to heat treatment. It will be appreciated that where there is little forming to be done on the composite assembly it may be heat treated either prior to or subsequent to such fabrication to provide the desired tensile strengths in excess of 240,000 p. s. i.

In order to more clearly demonstrate the outstanding advantage of the composite assembly of this invention, reference may be had to the following Table I which illustrates the tensile properties of the steels employed in the composite assembly as well as the tensile properties of the composite assembly.

*Table I.—Tensile properties*

| Heat treatment | Temp., ° F. | Yield strength 0.2 percent offset (p. s. i.) | Tensile strength (p. s. i.) | Elongation (percent) |
| --- | --- | --- | --- | --- |
| A. Unclad air hardening hot work die steel: | | | | |
| 1,850° F.; 1 hr.; A. C.+1,000° F.; 2 hr.; A. C. | R. T. | 216,000 | 282,180 | 13.0 |
| 1,950° F.; 1 hr.; A. C+1,000° F.; 2 hr.; A. C. | R. T. | 238,000 | 303,850 | 12.0 |
| 2,050° F.; 1 hr.; A. C.+1,000° F.; 2 hr.; A. C. | R. T. | 251,000 | 324,300 | 8.0 |
| 1,950° F.; 1 hr.; A. C.+1,000° F.; 2 hr.; A. C. | 1,000 | | 230,000 | 6.0 |
| B. 13 percent clad: 2,000° F.; 1 hr.; A. C.+1,000° F.; 2 hr.; A. C. | R. T. | 207,700 | 268,400 | 7.5 |
| C. Unclad air hardening hot work die steel:[1] 2,000° F.; 1 hr.; A. C. +1,000° F.; 2 hr.; A. C. | R. T. | 168,600 | 202,500 | 2.5 |
| D. 13 percent clad:[1] 2,000° F.; 1 hr.; A. C.+1,000° F.; 2 hr.; A. C. | R. T. | 201,900 | 247,660 | 5.0 |

[1] Heat treatment performed without benefit of a protective atmosphere.

The air hardening hot work die steel from which the data contained in Table I was obtained had a composition of about 0.35% carbon, about 0.35% manganese, about 1.10% silicon, about 5.25% chromium, about 0.45% vanadium, about 1.25% molybdenum and the balance iron with incidental impurities. The stainless steel which was used to clad the air hardening hot work die steel was the standard AISI Type 304 austenitic stainless steel having a nominal composition of about 0.06% carbon, about 1.5% manganese, about 0.75% silicon, about 18.75% chromium, about 9.0% nickel and the balance iron with incidental impurities. From the data recorded in subsection A of Table I it is seen that increasing the hardening temperature from 1850° F. to 2050° F., the same tempering treatment being applied in each case, has been successful in increasing the tensile strength of the air hardening hot work die steel from 282,180 p. s. i. up to 324,300 p. s. i. It must be noted that the foregoing heat treatments were conducted in an atmosphere which prevented decarburization. It is thus apparent that the air hardening hot work die steel is capable of obtaining extremely high tensile strengths and yield strengths as set forth in Table I together with good ductility. This strength is substantially maintained when the steel is heated to a temperature of 1000° F. and tested at that temperature. As set forth in subsection A, after hardening at 1950° F. for 1 hour, air cooling and thereafter tempering at 1000° F. for 2 hours and air cooling, this steel has a tensile strength of 230,000 p. s. i. and a ductility as measured by the percentage elongation of 6% when the steel is tested at 1000° F. All of the foregoing tests were made on the standard 0.505 inch diameter tensile bars.

As compared to the high strength of the air hardening hot work die steel, the standard AISI Type 304 stainless steel has a tensile strength of about 85,000 p. s. i. and 0.2% yield strength of about 30,000 p. s. i. with a corresponding elongation of about 60%. It is thus apparent that when Type 304 austenitic stainless steel is employed for cladding, the austenitic stainless steel contributes little to the strength of the composite assembly. Referring now to subsection B of Table I, it is seen that when the air hardening hot work die steel of subsection A of Table I is clad with AISI Type 304 stainless steel on both surfaces, the total weight of the stainless steel comprising about 13% by weight of the composite assembly, that the tensile strength of the composite remains at a high value. As shown in subsection B, the clad material had a tensile strength of 268,400 p. s. i., a yield strength of 207,700 p. s. i. and an elongation of 7.5%.

The air hardening hot work die steel which comprises the core of the composite assembly is especially susceptible to surface decarburization upon heat treatment. This is especially true when the material is in the form of a thin sheet and is heat treated in air. Thus all of the data obtained for the unclad air hardening hot work die steel which is reported in subsection A of Table I was obtained on material which was heat treated in a protective atmosphere to prevent any surface decarburization of the steel. In order to show the adverse effect of decarburization when this material is heat treated in air, attention is directed to subsection C of Table I which illustrates the effect of heat treatment in air on the tensile properties of such steel and unclad air hardening hot work die steel. In subsection C it is seen that after heat treating at 2000° F. for 1 hour, air cooling, followed by tempering at 1000° F. for 2 hours and air cooling, the unclad air hardening hot work die steel has a room temperature tensile strength of about 202,500 p. s. i., a yield strength of 168,600 p. s. i. and an elongation of 2.5%. On the other hand, the same steel when clad with Type 304 austenitic stainless steel, the total weight of the cladding material being about 13% by weight of the composite assembly and having the same heat treatment, possessed room temperature mechanical properties including a tensile strength of 247,660 p. s. i., a yield strength of 201,900 p. s. i. and an elongation of about 5% as recorded in subsection D. It is once seen that with the use of the composite assembly, decarburization during heat treatment is virtually eliminated and the composite assembly possesses a high tensile strength and yield strength and decidedly superior ductility as measured by the percentage elongation. Thus the surface protection afforded by the stainless steel permits the processing of this composite assembly on conventional mill equipment without the danger of decarburization. Where the composite assembly is to be heat treated for long periods of time at elevated temperatures, it may be desirable to provide a diffusion barrier intermediate the core and surface layers to effectively inhibit any diffusion of the carbron from the base metal to the surface layers. This can be done by plating the core and/or the surface layers with a thin film of metal, for example, nickel or copper. However, in most applications such intermediate layer is unnecessary especially where a continuous heat treatment is employed.

The composite assembly consisting of a core of the air hardening hot work die steel and the surface layers of an austenitic stainless steel is hot worked to the desired semi-finished mill product, for example, sheet or strip. The composite assembly in sheet or strip form after hot rolling has a very high core hardness and a high strength due to the air hardening characteristic of the hot work die steel and as such it is unsuited for either cold rolling or forming operations. The composite assembly can be annealed by heating it to a temperature of about 1500° F. for a time period sufficient to insure adequate heating throughout the section of the composite assembly and thereafter slowly cooling, preferably furnace cooling. Tensile properties obtained when this material is annealed in the foregoing manner are sufficient for subjecting the material to a later cold rolling or forming operation. Test data indicate that this material after annealing in the above described manner possesses a longitudinal tensile strength of about 127,680 p. s. i., a yield strength of about 90,580 p. s. i. and an elongation of about 15%. The transverse tensile properties are in close agreement with the longitudinal properties, the tensile strength being about 126,660 p. s. i., the yield strength about 86,690 p. s. i. and the elongation about 14.5%.

As clearly seen from the foregoing data, the composite assembly in the annealed condition readily lends itself to any cold working or cold forming operation and as will be clearly pointed out hereinafter, it is in an ideally suited condition for shipment from the producer to the fabricator who will form the composite assembly into the desired shape of the finished product. Thereafter, the steel can be heat treated in the manner hereinafter set forth in order to obtain the desired properties necessary for the intended use of the composite assembly.

The heat treatment to be applied to the steel of this invention is flexible and readily adapts itself to the optimum combination desired in the finished product. Thus within the ranges given hereinafter, a heat treatment can be selected which will insure maximum ductility or maximum strength or the optimum combination of both ductility and strength. This heat treatment consists of heating to a temperature in the range between about 1850° F. and 2050° F. for a time period of between about 10 minutes and 1 hour depending upon the section thickness and thereafter air cooling to room temperature, followed by tempering in the range between 850° F. and 1050° F. for a time period of between 1 and 8 hours depending upon the thickness of the final product. In order to more clearly illustrate the effect of the hardening temperature on the 13% clad composite assembly having the air hardening hot work die steel core of the composition set forth hereinbefore and clad surfaces of AISI Type 304 stainless steel, reference may be had to Table II and the data recorded therein.

Table II

| Hardening temperature | Tensile strength (p. s. i.) | 0.2 percent yield strength (p. s. i.) | Percent elongation (2") |
| --- | --- | --- | --- |
| 1,850° F | 239,200 | 193,500 | 7.0 |
| 1,900° F | 240,900 | 194,600 | 6.0 |
| 1,950° F | 252,200 | 214,000 | 5.5 |
| 2,000° F | 258,400 | 206,900 | 5.0 |
| 2,050° F | 260,300 | 206,900 | 5.0 |

From the data set forth in Table II it is seen that increasing the hardening temperature from 1850° F. to 2050° F. has produced an increase in the tensile strength of from 239,200 p. s. i. to 260,300 p. s. i. with a correspondingly similar increase in the yield strength of the composite assembly. The ductility as measured by the percentage elongation correspondingly decreases with the increase in the hardening temperature. Thus it is apparent from Table II that the maximum ductility in the case hardened and untempered condition is obtained by using the lower temperatures of the hardening tempering range whereas maximum strength is obtained by using the high temperature of the hardening tempering range. The hardness of the composite assembly shows little, if any, variation throughout the hardening temperature range.

The following Table III illustrates the effect of the tempering temperature and time which may be selected by the dictates of the strength and ductility requirements. The data contained in Table III was obtained after hardening at 2000° F. followed by air cooling and thereafter tempering in accordance with the schedule set forth in Table III.

Table III

| Temper | Tensile strength | 0.2 percent yield strength | Percent elongation |
| --- | --- | --- | --- |
| 2 hrs., 400° F | 250,700 | 173,000 | 8.5 |
| 4 hrs., 400° F | 244,450 | 172,600 | 8.5 |
| 1 hr., 900° F | 263,500 | 202,510 | 9.5 |
| 2 hrs., 900° F | 259,600 | 190,500 | 9.5 |
| 4 hrs., 900° F | 265,700 | 182,800 | 9.5 |
| 1 hr., 950° F | 256,215 | 195,500 | 12.0 |
| 2 hrs., 950° F | 260,200 | 178,800 | 10.5 |
| 1 hr., 1,000° F | 272,100 | 201,600 | 7.5 |
| 2 hrs., 1,000° F | 268,400 | 207,700 | 7.5 |
| 4 hrs., 1,000° F | 263,500 | 211,200 | 6.2 |
| 1 hr., 1,050° F | 259,100 | 205,700 | 6.5 |
| 2 hrs., 1,050° F | 254,500 | 204,000 | 6.2 |
| 1 hr., 1,100° F | 235,600 | 193,300 | 5.7 |
| 2 hrs., 1,100° F | 228,910 | 187,310 | 5.2 |
| 4 hrs., 1,100° F | 211,800 | 178,700 | 7.2 |

It is apparent from Table III that the optimum combination of ductility and strength results from hardening the steel at about 2000° F. for 1 hour followed by air cooling and thereafter tempering for 1 hour at 950° F. For maximum strength with a correspondingly lower ductility the data of Table III indicates that a heat treatment of hardening at about 2000° F. for 1 hour followed by air cooling and tempering for 1 hour at about 1000° F. produces maximum strength therein.

The most readily reproducible results of heat treatment of the composite assembly are obtained where the composite assembly is subzero cooled intermediate the hardening treatment and the tempering treatment set forth hereinbefore. In this respect, reference is directed to Table IV which illustrates the effect of applying the subzero cooling treatment to the composite assembly after hardening at a temperature of 2000° F. followed by air cooling to room temperature and thereafter subzero cooling at a temperature of about −100° F. followed by a tempering treatment for 2 hours at the different temperatures indicated.

Table IV

| Treatment | Tensile strength | 0.2% yield strength | Percent elongation |
| --- | --- | --- | --- |
| −100° F., 1 hr.;+2 hrs., 200° F | 256,000 | 194,300 | 8.2 |
| −100° F., 1 hr.;+2 hrs., 600° F | 243,200 | 191,100 | 7.0 |
| −100° F., 1 hr.;+2 hrs., 800° F | 247,600 | 202,300 | 8.0 |
| −100° F., 1 hr.;+2 hrs., 900° F | 270,180 | 201,390 | 8.0 |
| −100° F., 1 hr.;+2 hrs., 1,000° F | 266,000 | 196,500 | 8.0 |
| −100° F., 1 hr.;+2 hrs., 1,100° F | 227,300 | 191,100 | 6.0 |

From the data recorded in Table IV it is seen that a very high strength with good ductility is obtained when this steel is hardened at 2000° F. followed by subzero cooling at −100° F. for 1 hour and thereafter tempered for 2 hours at 900° F. This material possessed a tensile strength of 270,180 p. s. i., a yield strength of 201,390 p. s. i. and an elongation of 8%. By employing the subzero cooling treatment it is possible to make use of the so-called austenitic borderline stainless steels which require a subzero cooling treatment in order to obtain maximum strength. These steels having a tensile strength of 200,000 p. s. i. and greater, materially add to the overall tensile properties of the composite assembly without suffering any adverse effect of loss of corrosion resistance. Such steels are stable and maintain their strength when heat treated to a temperature of up to 1000° F.

From the foregoing it is seen that in the heat treatment of the composite assembly, a decided advantage is derived from the surface layers of the austenitic stainless steels which is effective to prevent decarburization, thus permitting all heat treatments to be conducted in non-protective atmospheres. This is particularly important where the composite material is in the form of thin sheet having a thickness in the range between 0.035 inch and about 0.70 inch in thickness. As was clearly pointed out, the composite assembly had a tensile strength of about 30,000 p. s. i. greater than the unclad air hardened hot work die steel when both were treated in the same manner. The fact that the composite assembly can be heat treated in a nonprotective atmosphere materially simplifies the heat treatment of the composite assembly for commercial applications.

We claim:

1. A heat treated composite assembly having excellent strength, ductility and corrosion resistance when used at temperatures of up to 1000° F. consisting of, austenitic stainless steel surface layers and an air hardening hot work die steel core integrally bonded together, the stainless steel of the surface layers having a composition comprising, up to 0.25% carbon, less than 15.0% manganese, up to 1.5% silicon, from 12.0% to 20.0% chromium, from 3.5% to 10.0% nickel, less than 3.5% molybdenum, less than 0.15% nitrogen, and the balance iron, the air hardening hot work die steel of the core having a composition comprising from 0.25% to 0.45% carbon, from 0.15% to 0.60% manganese, from 0.70% to 1.20% silicon, from 4.5% to 6.0% chromium, from 0.10% to 1.2% vanadium, from 0.9% to 1.75% molybdenum, up to 1.5% tungsten, up to 2.0% nickel and the balance iron, and which has been heated to a temperature in the range between 1850° F. and 2050° F., air quenched to room temperature, and tempered at a temperature in the range between 850° F. and 1050° F.

2. A heat treated composite assembly having excellent strength, ductility and corrosion resistance when used at temperatures of up to 1000° F. consisting of, austenitic stainless steel surface layers and an air hardening hot work die steel core, the austenitic stainless steel surface layers comprising 8% to 20% of the weight of the composite assembly and being integrally bonded to the core of hot work die steel throughout the contacting adjacent surfaces, the stainless steel of the surface layers having a composition comprising, up to 0.25% carbon, less than 15.0% manganese, up to 1.5% silicon, from 12.0% to 20.0% chromium, from 3.5% to 10.0% nickel, less than 3.5% molybdenum, less than 0.15% nitrogen, and the balance iron, the air hardening hot work die steel of the core having a composition comprising from 0.25% to 0.45% carbon, from 0.15% to 0.60% manganese, from 0.70% to 1.20% silicon, from 4.5% to 6.0% chromium, from 0.10% to 1.2% vanadium, from 0.9% to 1.75% molybdenum, up to 1.5% tungsten, up to 2.0% nickel and the balance iron, and which has been heated to a temperature in the range between 1850° F. and 2050° F., air quenched to room temperature, and tempered at a temperature in the range between 850° F. and 1050° F.

3. A heat treated composite assembly having excellent strength, ductility and corrosion resistance when used at temperatures of up to 1000° F. consisting of, a core of an air hardening hot work die steel and surface layers of austenitic stainless steel disposed on opposite sides of the core with adjacent surface areas of the core and the surface being in intimate contact with one another, the austenitic stainless steel surfaces comprising 8% to 20% of the weight of the composite assembly and being integrally bonded to the core of the hot work die steel throughout the adjacent contacting surface areas, the stainless steel surface layers having a composition comprising, up to 0.25% carbon, less than 2.0% manganese, up to 1.5% silicon, from 12.0% to 20.0% chromium, from 3.5% to 10.0% nickel, less than 3.5% molybdenum, less than 0.15% nitrogen, and the balance iron, the air hardening hot work die steel core having a composition comprising from 0.25% to 0.45% carbon, from 0.15% to 0.60% manganese, from 0.70% to 1.20% silicon, from 4.5% to 6.0% chromium, from 0.10% to 1.2% vanadium, from 0.9% to 1.75% molybdenum, up to 1.5% tungsten, up to 2.0% nickel and the balance iron, and which has been heated to a temperature in the range between 1850° F. and 2050° F., air quenched to room temperature and tempered at a temperature in the range between 850° F. and 1050° F.

4. A heat treated composite assembly having excellent strength, ductility and corrosion resistance when used at temperatures of up to 1000° F. consisting of austenitic stainless steel surface layers and an air hardening hot work die steel core, the austenitic stainless steel surface layers comprising from 12% to 20% of the weight of the composite assembly and being integrally bonded to the core of the hot work die steel, the austenitic stainless steel of the surface layers having a composition comprising, up to 0.15% carbon, up to 2.0% manganese, up to 1.5% silicon, from 17.0% to 19.0% chromium, from 7.0% to 9.0% nickel, less than 0.15% nitrogen and the balance iron, the air hardening hot work die steel of the core having a composition comprising from 0.30% to 0.42% carbon, from 0.20% to 0.90% manganese, from 0.25% to 1.1% silicon, from 4.0% to 5.25% chromium, from 0.20% to 0.60% vanadium, from 1.0% to 1.5% molybdenum, up to 1.5% tungsten, up to 2.0% nickel and the balance iron, and which has been heated to a temperature in the range between 1850° F. and 2050° F., air quenched to room temperature, subzero cooled to a temperature in the range between —80° F. and —110° F. and thereafter tempered at a temperature in the range between 850° F. and 1050° F.

5. A heat treated composite assembly having excellent strength, ductility and corrosion resistance when used at temperatures of up to 1000° F. consisting of austenitic stainless steel surface layers and an air hardening hot work die steel core, the austenitic stainless steel surface layers comprising from 12% to 20% of the weight of the composite assembly and being integrally bonded to the core of the hot work die steel, the austenitic stainless steel of the surface layers having a composition comprising, 0.03% to 0.15% carbon, less than 2.0% manganese, up to 0.5% silicon, from 12.0% to 18.0% chromium, from 3.5% to 7.0% nickel, less than 3.5% molybdenum, less than 0.15% nitrogen, and the balance iron, the air hardening hot work die steel of the core having a composition comprising from 0.30% to 0.42% carbon, from 0.20% to 0.40% manganese, from 0.75% to 1.1% silicon, from 4.0% to 5.25% chromium, from 0.20% to 0.6% vanadium, from 1.0% to 1.5% molybdenum, up to 1.5% tungsten, up to 2.0% nickel and the balance iron, and which has been heated to a temperature in the range between 1850° F. and 2050° F., air quenched to room temperature, subzero cooled to a temperature in the range between —80° F. and —110° F. and thereafter tempered at a temperature in the range between 850° F. and 1050° F.

References Cited in the file of this patent

UNITED STATES PATENTS 2,736,670 Griffith Feb. 28, 1956

OTHER REFERENCES

Seabright: "The Selection and Hardening of Tool Steels," first ed., 1950, pages 217 through 219.

"Iron Age," December 2, 1954, pages 113 through 116.